(12) United States Patent
Prashant et al.

(10) Patent No.: US 10,511,720 B2
(45) Date of Patent: Dec. 17, 2019

(54) METHOD AND APPARATUS FOR DATA MEDIATION

(71) Applicant: Telefonaktiebolaget LM Ericsson (publ), Stockholm (SE)

(72) Inventors: Prafulla Prashant, New Delhi (IN); Munish Agarwal, New Delhi (IN); Rakesh Bajpai, New Delhi (IN); Pratik Mehta, Mississauga (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 156 days.

(21) Appl. No.: 15/549,818

(22) PCT Filed: Feb. 10, 2015

(86) PCT No.: PCT/IN2015/050009
§ 371 (c)(1),
(2) Date: Aug. 9, 2017

(87) PCT Pub. No.: WO2016/128989
PCT Pub. Date: Aug. 18, 2016

(65) Prior Publication Data
US 2018/0034975 A1 Feb. 1, 2018

(51) Int. Cl.
*H04L 12/14* (2006.01)
*H04M 15/00* (2006.01)
*H04W 4/24* (2018.01)

(52) U.S. Cl.
CPC ............ *H04M 15/53* (2013.01); *H04L 12/14* (2013.01); *H04L 12/1403* (2013.01);
(Continued)

(58) Field of Classification Search
None
See application file for complete search history.

(56) References Cited

U.S. PATENT DOCUMENTS 7,936,780 B1 * 5/2011 Kompella ............. H04L 45/507
370/254
8,526,618 B2 9/2013 Little et al.
(Continued)

FOREIGN PATENT DOCUMENTS

EP 2124419 A1 * 11/2009 ......... H04L 41/0233
EP 2124419 A1 11/2009
(Continued)

OTHER PUBLICATIONS

3GPP, "3rd Generation Partnership Project; Technical Specification Group Services and System Aspects; Telecommunication management; Charging management; Charging Data Record (CDR) file format and transfer (Release 12)", 3GPP TS 32.297 V12.2.0, Dec. 2014, 1-29.
(Continued)

*Primary Examiner* — Cai Y Chen
(74) *Attorney, Agent, or Firm* — Murphy, Bilak & Homiller, PLLC

(57) ABSTRACT

The teachings herein disclose a method and apparatus for data mediation in a telecommunication network provides advantageous processing of an incoming data stream in a matter that reduces the amount of decoding needed for processing and correspondingly reduces the amount of re-encoding needed for transport of the processed data stream. These teachings make use of a working data structure that provides a memory-efficient data structure for processing targeted data items in the data stream and are implemented, for example, in a data mediation node that includes one or more communication interfaces, e.g., for receiving incoming data streams for data-mediation processing, and for sending along processed data streams to targeted recipients.

17 Claims, 8 Drawing Sheets

(52) U.S. Cl.
CPC ........ *H04L 12/1425* (2013.01); *H04M 15/41* (2013.01); *H04M 15/8214* (2013.01); *H04W 4/24* (2013.01)

(56) References Cited

U.S. PATENT DOCUMENTS

| | | |
|---|---|---|
| 8,819,135 B2 | 8/2014 | Karlsson |
| 2005/0114355 A1 | 5/2005 | Nuttila |
| 2011/0010581 A1 | 1/2011 | Tanttu et al. |
| 2012/0069745 A1* | 3/2012 | Kini ................. H04L 45/22 370/252 |
| 2015/0019514 A1 | 1/2015 | Forster et al. |

FOREIGN PATENT DOCUMENTS

| | | |
|---|---|---|
| WO | 2004095326 A1 | 11/2004 |
| WO | 2005057873 A1 | 6/2005 |

OTHER PUBLICATIONS

Unknown, Author, "3rd Generation Partnership Project; Technical Specification Group Services and System Aspects; Telecommunication management; Charging management; Charging Data Record (CDR) parameter description (Release 12)", 3GPP TS 32.298 V12.4.0, Jun. 2014, pp. 1-170.

* cited by examiner

```
CDRCCN DEFINITIONS IMPLICIT TAGS ::=
BEGIN
Sample::=SEQUENCE {
    sessioninfo [0] SessionInfo,
    user        [1] User,
    imsi        [2] OCTET STRING
}

SessionInfo::=SEQUENCE {
    sessionID   [0] UTF8String,
    sessionType [1] INTEGER
}

User::=SEQUENCE {
    userID      [0] UTF8String
}
END
```

Sample Data
sessionInfo
    sessionID = Test
    sessionType = 1
user
    userID = USER
imsi = 0203

Encoded Hex Representation of Byte Stream

METHOD AND APPARATUS FOR DATA MEDIATION

TECHNICAL FIELD

The present invention generally relates to telecommunication networks, and particularly relates to data mediation in a telecommunication network.

BACKGROUND

Almost every facet of operations in telecommunication networks and other complex processing systems involves the collection, processing and transport of data. Oftentimes, for reasons of bandwidth, security, etc., data is encoded or otherwise encapsulated for transport between networked nodes. Consequently, a significant computational burden arises in such systems, driven by repeated, ongoing need for generating, processing, coding and decoding data.

The burden is especially acute in certain example contexts, such as in the area of "data mediation" within a mediation system in a telecommunication network. Network data is the enabling ingredient for all revenue assurance operations for any network operator, and it must be complete and correct for the network operator to enforce policies, generate charging and billing information, and to undertake any among a broad range of other actions, such as market analyses, service assurance, network planning, etc.

In the telecommunication network context, a mediation system collects, formats and distributes data within the network, for use in range of activities, including charging and billing, fraud detection and statistical analyses. The typical mediation system interfaces with various types of nodes, including access and core network nodes, e.g., for securing Charging Data Records, CDRs, associated with chargeable telecommunication events occurring within the network. Correspondingly, the mediation system provides such data, or aggregated or modified collections of such data, to various Operations Support System, OSS, servers. OSS servers perform "back-office" activities, such as maintenance and provisioning support for communication services. The same or other mediated data is also provided to various Business Support Systems, BSS, servers. BSS servers generally provide subscriber-facing services, such as billing and order management functions.

In a particular example, the mediation system collects data from various "south bound" interfaces that face the core and/or access networks. The mediation system applies various processing to the collected data, such as consolidation, co-relation or correlation, enrichment, etc., and the processed data is sent out on one or more "north bound" interfaces that face various BSS and OSS servers.

In many of the scenarios, the data incoming to the mediation system is encoded in TLV format where TLV exists for Type, Length and Value. Protocols such as ASN.1, Diameter, Radius, Mobile ad hoc Network, MANET, etc., all support data that are represented in the TLV format. TLV-encoded data requires decoding before processing. TLV decoding provides an object-based representation for easier manipulation to the "users" of that data. Here, the term "users" has a specialized meaning, as it denotes a process or function that takes in certain data for processing. Frequently, after such processing, the resulting data must be re-encoded according to the applicable specifications, for delivery to a further node or user, e.g., for further manipulation or archiving.

Often the involved data records involve a multiplicity of individual data fields or items. See, for example, the following two documents which provide relevant specifications for the representation of CDRs in networks based on the following Third Generation Partnership Project, 3GPP, specifications: 3GPP TS 32.297: *Charging Data Record (CDR) file format and transfer*, v12.2.0; and 3GPP TS 32.298: *Charging Data Record (CDR) parameter description*. Significant computational loading and processing time is consumed in association with receiving complex, encoded data structures, decoding them, processing selected data items from among the decoded data, and then re-encoding the data for transport to a further node or process.

It is thought that the typical mediation system may spend as much as forty to fifty percent of its time performing data decoding and encoding, and there have been attempts to address at least certain aspects of that processing overhead. See, for example, U.S. Pat. No. 8,819,135 to Karlsson, which uses a form of selective parsing to improve efficiencies when processing data streams incoming from a data communication network. U.S. Pat. No. 8,526,618 to Little provides another known example of processing encoded messages at a receiver. And, in a slightly different context, one might usefully refer to the widely available references for the XML-document parsing algorithm known as "SAX" or "Simple API for XML".

SUMMARY

The teachings herein disclose a method and apparatus for data mediation in a telecommunication network and provide advantageous processing of an incoming data stream in a matter that reduces the amount of decoding needed for processing and correspondingly reduces the amount of re-encoding needed for transport of the processed data stream. These teachings make use of a working data structure that provides a memory-efficient data structure for processing targeted data items in the data stream and are implemented. These teachings are implemented, for example, in a data mediation node that includes one or more communication interfaces, e.g., for receiving incoming data streams for data-mediation processing, and for sending along processed data streams to targeted recipients.

An example method of processing at a mediation node configured for data mediation operations in a telecommunication network includes receiving an incoming data stream. The incoming data stream comprises encoded data items encoded according to a first encoding and is arranged according to a defined hierarchical structure. The method further includes storing the incoming data stream as a stored data stream, where the incoming data stream is stored initially without decoding at a root node of a working data structure that defines further nodes corresponding to the plurality of data items encoded in the stored data stream. The method further includes identifying a targeted data item in the stored data stream—i.e., a data item that is targeted for data mediation processing. Still further, the method includes extracting the targeted data item based on traversing the defined hierarchical structure of the stored data stream along a traversal path until reaching the targeted data item.

For each intervening data item encountered along the traversal path before reaching the targeted data item, the method includes moving, without decoding, the intervening data item from the root node to a corresponding further node in the working data structure. For the targeted data item, the method includes decoding the targeted data item and populating a corresponding further node in the working data structure with the decoded targeted data item. The method additionally includes providing the working data structure for processing of the decoded targeted data item, e.g., for processing according to the operations defined in a given workflow.

An example mediation node according to an embodiment disclosed herein is configured for data mediation operations in a telecommunication network and it includes a communication interface and a processing circuit operatively associated with the communication interface. The communication interface is configured to receive an incoming data stream comprising encoded data items encoded according to a first encoding and arranged according to a defined hierarchical structure. Correspondingly, the processing circuit is configured to store the incoming data stream as a stored data stream, where the stored data stream is stored without decoding at a root node of a working data structure that defines further nodes corresponding to a plurality of data items encoded in the stored data stream.

The processing circuit is further configured to identify a targeted data item in the stored data stream and extract the targeted data item, based on being configured to traverse the defined hierarchical structure of the stored data stream along a traversal path until reaching the targeted data item. For each intervening data item encountered along the traversal path before reaching the targeted data item, the processing circuit is configured to move, without decoding, the intervening data item from the root node to a corresponding further node in the working data structure. For the targeted data item, the processing circuit is configured to decode the targeted data item and populate a corresponding further node in the working data structure with the decoded targeted data item, and further to provide the working data structure for processing of the decoded targeted data item. For example, it passes the working data structure along to a given "processing job" or other function, or it makes the working data structure available for such processing.

In yet another embodiment, a mediation node is configured for data mediation operations in a telecommunication network and comprises means adapted to receive an incoming data stream comprising encoded data items encoded according to a first encoding and arranged according to a defined hierarchical structure. The mediation node further comprises means adapted to store the incoming data stream as a stored data stream, where the stored data stream is stored without decoding at a root node of a working data structure that defines further nodes corresponding to a plurality of data items encoded in the stored data stream.

The mediation node further includes means adapted to identify a targeted data item in the stored data stream, targeted for data mediation processing and to extract the targeted data item based on traversing the defined hierarchical structure of the stored data stream along a traversal path until reaching the targeted data item. For each intervening data item encountered along the traversal path before reaching the targeted data item, the mediation node is adapted to move, without decoding, the intervening data item from the root node to a corresponding further node in the working data structure. For the targeted data item, the mediation node is adapted to decode the targeted data item, populate a corresponding further node in the working data structure with the decoded targeted data item, and to provide the working data structure for processing of the decoded targeted data item.

In another example implementation, such as may be realized in digital processing circuitry, the mediation node includes a first module configured to receive an incoming data stream comprising encoded data items encoded according to a first encoding and arranged according to a defined hierarchical structure. The mediation node further includes a second module configured to store the incoming data stream as a stored data stream. Here, the stored data stream is stored without decoding at a root node of a working data structure that defines further nodes corresponding to a plurality of data items encoded in the stored data stream. The mediation node includes a third module configured to identify a targeted data item in the stored data stream, which data item is targeted for data mediation processing.

Correspondingly, the mediation node includes a fourth module configured to extract the targeted data item based on traversing the defined hierarchical structure of the stored data stream along a traversal path until reaching the targeted data item. For each intervening data item encountered along the traversal path before reaching the targeted data item, the fourth module is configured to move, without decoding, the intervening data item from the root node to a corresponding further node in the working data structure. For the targeted data item, the fourth module is configured to decode the targeted data item and populate a corresponding further node in the working data structure with the decoded targeted data item. Still further, the mediation node includes a fifth module configured to provide the working data structure for processing of the decoded targeted data item.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 7 is an example representation of an incoming data stream, which is structured as an encoded byte stream having a number of data items or fields, and having a hierarchical data structure or arrangement for those data items or fields.

DETAILED DESCRIPTION

Figure 1:
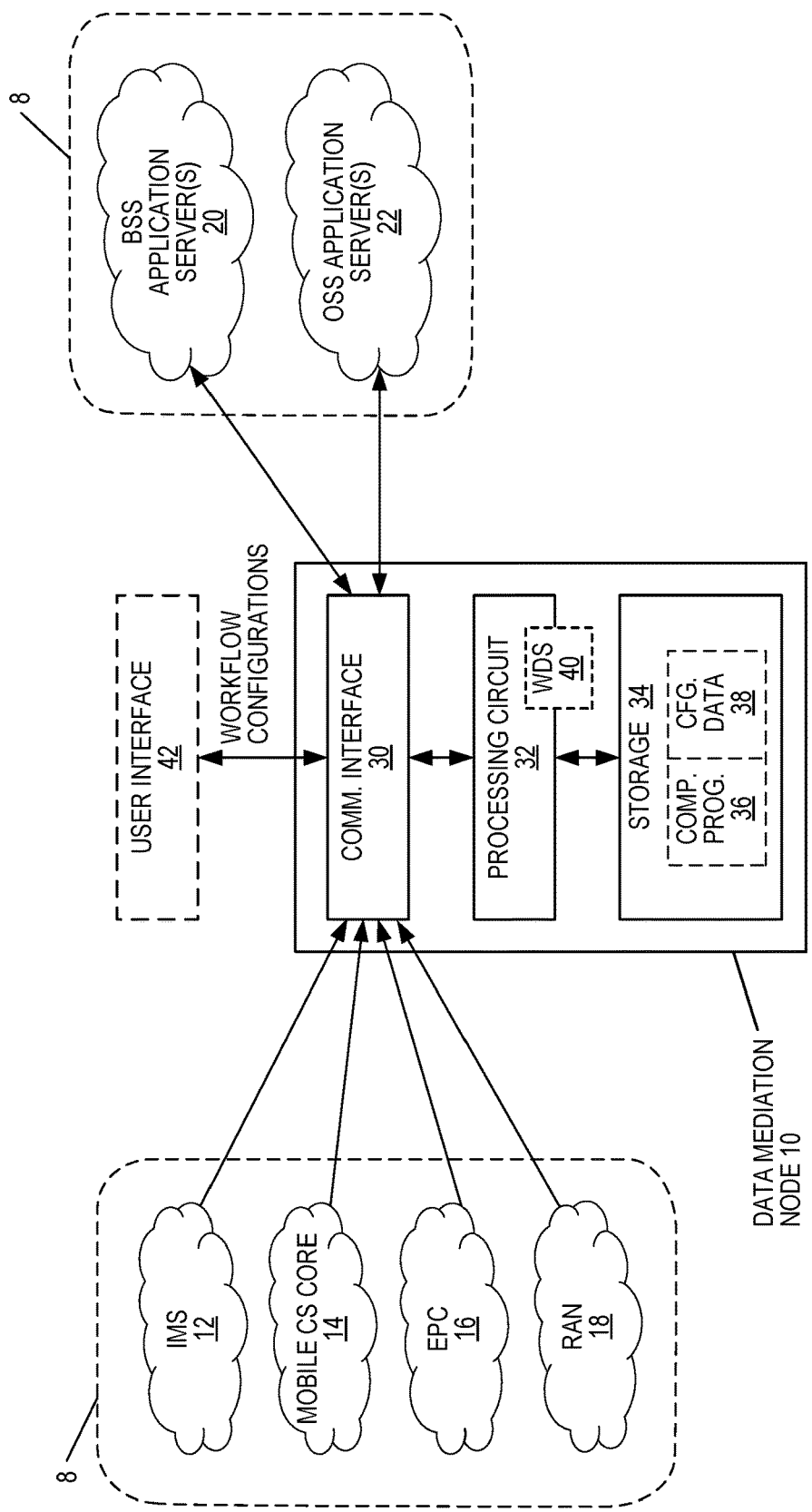
FIG. 1 is a block diagram of one embodiment of a mediation node, shown in context with an example telecommunication network.

FIG. 1 illustrates a telecommunication network 8 that includes or is associated with a data mediation node 10 that is depicted according to an example embodiment. By way of example, the telecommunication network 8—hereafter, "network 8"—includes an Internet Protocol, IP, Multimedia Subsystem or IMS 12, a circuit-switched core network 14, an Evolved Packet Core or "EPC" network 16, and one or more Radio Access Networks or RANs 18. In one or more examples, the RAN or RANs 18 include an Evolved Universal Terrestrial Radio Access Network or E-UTRAN, for providing wireless communication links to various subscriber devices, such as "user equipments" or UEs.

The example network 8 also includes one or more Business Support Systems, BSS, servers 20, and one or more Operations Support Systems, OSS, servers 22. Correspondingly, the data mediation node 10 can be understood as occupying a mediation role, in which it receives network data from any one or more of the IMS 12, the core network 14, the EPC 16, and the RAN(s) 18, performs one or more mediation operations on that data, and passes along the resulting processed data to the BSS servers 20 and/or the OSS servers 22. Here, the term "network data" refers to Charging Data Records, CDRs, and/or other billing, operations, and management data underlying the provisioning and providing of communication services to subscribers of the network 8. More broadly, the data mediation node 10 collects, formats and distributes network data of essentially any type or types, for one or more purposes. Example purposes include charging and billing, fraud detection, performance analysis, network planning, or other statistical analyses.

The illustrated embodiment of the data mediation node 10—hereafter, "mediation node 10"—includes a communication interface 30 that is configured to receive an incoming data stream comprising encoded data items encoded according to a first encoding and arranged according to a defined hierarchical structure. Further, the mediation node 10 includes a processing circuit 32 that is operatively associated with the communication interface 30. The processing circuit 32 further includes or is associated with storage 34, which in one or more embodiments stores a computer program 36 and certain configuration data 38.

In at least some embodiments, the processing circuit 32 comprises processing circuitry—e.g., a microprocessor, DSP, FPGA, ASIC, etc.—that is configured to carry out the processing operations taught herein, based at least in part on execution by the processing circuit 32 of the computer program instructions comprising the computer program 36. Such processing may be further controlled or may otherwise be informed by the configuration data 38, where such data may include so called "workflow" instructions. As will be explained later, a workflow is a defined task or set of tasks to be performed with respect to particular incoming data or with respect to particular types of incoming data.

The storage 34 comprises one or more types of computer readable media, and may comprise volatile storage, such as SRAM and/or DRAM. Additionally, or alternatively, the storage 34 comprises non-volatile storage, such as FLASH, EEPROM, Solid State Disk, etc. In any case, the storage 34 provides non-transitory storage for the computer program 36, in embodiments that use the computer program 36. Here, the term "non-transitory storage" does not necessarily mean permanent storage, but does mean "persistent" storage of at least some duration. As such, the term excludes "storage" of information in a mere propagating signal.

Whether it comprises programmed circuitry or fixed circuitry, or some combination of programmed and fixed circuitry, the processing circuit 32 is configured to store the incoming data stream as a stored data stream. In particular, the incoming data stream is stored initially without decoding at a root node of a working data structure 40 that defines further nodes 122 corresponding to a plurality of data items encoded in the stored data stream. The working data structure 40 may be generated and held in a working memory of the processing circuit 32, as part of run-time processing performed with respect to the incoming data stream.

In the non-limiting example embodiment, the mediation node 10 includes a user interface 42. For example, the user interface 42 comprises a keyboard and display or other input/output devices or circuitry, or comprises a network interface to another computer system with input/output devices. In any case, the user interface 42 is a non-limiting example of a mechanism by which workflow definitions may be created, deleted, modified, and saved, for use by the mediation node 10. Here, a "workflow" is a task definition and it specifies certain processing to be performed to certain data items, and may include a host of processing directives to be followed by the mediation node 10 for certain types of data streams incoming to it.

With respect to the example data stream being discussed and its stored data stream counterpart, the processing circuit 32 is configured to identify a targeted data item in the stored data stream, targeted for data mediation processing, and to extract the targeted data item based on being configured to perform a number of operations or actions that obtain the targeted data item in decoded form. These operations avoid unnecessary decoding and provide advantageous memory management. As will be further explained, such processing "prep-populates" corresponding nodes in the working data structure 40 with encoded data items moved from the root node during extraction of the targeted data items. The pre-populating aids, for example, any further processing of the same data stream that targets any of the prepopulated data items.

In more detail, in an example embodiment, the processing circuit 32 is configured to extract a targeted data item from the stored data stream held in the root node, based on being configured to traverse the defined hierarchical structure of the stored data stream along a traversal path until reaching the targeted data item. For each intervening data item encountered along the traversal path before reaching the targeted data item, the processing circuit 32 is configured to move, without decoding, the intervening data item from the root node to a corresponding further node in the working data structure 40. Further, for the targeted data item, the processing circuit 32 is configured to decode the targeted data item and populate a corresponding further node in the working data structure 40 with the decoded targeted data item. Still further, the processing circuit 32 is configured to provide the working data structure 40 for processing of the decoded targeted data item.

In the context above, it will be appreciated that "further nodes" of the working data structure 40 correspond to respective data items in the stored data stream, and that the working data structure 40 has a tree structure or other arrangement that reflects the hierarchy or relationship between data items in the stored data stream. Of course, the working data structure 40 may not be built out completely, and instead the processing circuit 32 may instantiate only that amount or those branches and nodes of the working data structure 40 that are necessary to hold the targeted data items in decoded form, and to hold the intervening data items in encoded form. To the extent that more than one data item is targeted, it will be appreciated that the working data structure 40 will be built out with the further nodes corresponding to each traversal path—i.e., the hierarchical data structure path that leads to each targeted data item.

It is worth emphasizing here that only the targeted data items are decoded. That is, a targeted data item is moved from the root node, decoded, and stored in decoded form in its corresponding further node of the working data structure 40. The intervening data items are also moved from the root node and stored in corresponding further nodes of the working data structure 40, but they are not decoded. "Moving" a data item from the root node to its corresponding further node includes releasing or repurposing the root node memory allocated for that data item. For example, the involved root node memory can be logically redefined as the corresponding further node, e.g., using pointers or other data-structure management value, or the involved root node memory can be released back into a memory pool, and a new memory allocation can be made for the corresponding further node. In any case, it will be appreciated that moving data items from the root node to corresponding further nodes is done in a memory-efficient manner.

Consider a working example where the configuration data 38 includes a workflow definition that identifies one or more processing actions to be performed on incoming data streams of a defined type, and assume that such an incoming data stream is received at the mediation node 10. The processing circuit 32 stores the incoming data stream in encoded form, in a root node of a working data structure 40. The processing circuit 32 identifies one or more data items in the stored data stream that are targeted for processing. For each targeted data item, the processing circuit 32 traverses the hierarchical structure defined in the stored data stream— e.g., a tree structure or other parent/child object structure— until it reaches the targeted data item. The processing circuit 32 extracts the targeted data item, decodes it, and moves it to a corresponding node in the working data structure 40. Further, for each data item encountered by the processing circuit 32 on the traversal path leading to the targeted data item, where such items are referred to as intervening data items, the processing circuit 32 moves the intervening data item to a corresponding node in the working data structure 40, without decoding it.

The end result of such processing is that the root node of the working data structure 40 holds any remaining data items—i.e., data items not moved from the root node as being an intervening or targeted data item. The remaining data items are still in their encoded form and their hierarchical relationship within the stored data stream is preserved. The root node however no longer holds any data item from the stored data stream that were identified as a targeted data item, or encountered as an intervening data item. More particularly, each targeted data item is moved to a corresponding further node in the working data structure 40 and stored there in decoded form, and each intervening data item is moved to a corresponding further node in the working data structure 40 and stored there in encoded form. Because these further nodes of the working data structure 40 embody or are otherwise logically inter-linked according to the defined hierarchical data structure of the original incoming data stream, the hierarchical relationships between remaining data items, targeted data items, and intervening data items is preserved. This preservation of hierarchical data relationships is key to re-encoding an outgoing data stream after processing the targeted data items.

Thus, after receiving a given incoming data stream for processing, the processing circuit 32 builds out a working data structure 40 according to the above teachings. In so doing, the processing circuit 32 identifies the targeted data item or items and builds out the working data structure 40 accordingly. The resulting working data structure 40, including its one or more targeted data items held in decoded form, is provided for processing in accordance with one or more workflow definition. Such processing may be carried out by the processing circuit 32, or by other circuitry in the mediation node 10.

The workflow processing results in the modification of the targeted data items, or in the creation of new data items, and the working data structure 40 can be updated to reflect the results of such processing, or a new working data structure 40 can be created. Here, it may be noted that more than one workflow, or a least more than one processing operation, can be applied to any given working data structure 40. Moreover, such processing can use any resulting, new working data structures 40. Because each further processing operation may involve one or more of the data items already involved in prior processing—i.e., data items that were either targeted or traversed in the prior processing—the particular data items involved in the further processing may already have been moved from the root node to their corresponding nodes in the working data structure, thus avoiding the need to perform those actions again and thereby increasing the efficiency of the further processing.

It will also be appreciated that once all processing has been performed on a given working data structure 40, the data contained therein can be "re-packaged" according to any standard or protocol associated with the transport of the involved data type(s). For example, take the case where an incoming data stream comprises a CDR. After building out a working data structure 40 for the CDR according to the above teachings, and after finishing the processing operation or operations defined for processing the CDR, the data items held in the working data structure 40 can be re-encoded as a new or modified CDR that includes any new or modified data obtained via the applied processing. The newly encoded CDR can then be sent to a targeted recipient using the same protocols used for any other CDR exchanged within or by the mediation node 8. In this regard, a "targeted recipient" may be another computational process, function, or workflow being carried out within the mediation node 10, or the targeted recipient may be external to the mediation node 10, e.g., one of the BSS application servers 20 or one of the OSS application servers 22.

Thus, with respect to a given working data structure 40 that includes one or more decoded targeted data items, and assuming that all desired processing has been completed for the given working data structure 40, at least for a given workflow, the processing circuit 32 is configured to form an outgoing data stream. The processing circuit 32 forms the outgoing data stream based on being configured to re-encode the decoded targeted data item(s) after said processing or a corresponding derived data item generated by said processing, as a newly-encoded data item. The processing circuit 32 is further configured to aggregate the newly-encoded data item with the intervening data items previously moved to the corresponding further nodes in the working data structure 40, along with any remaining data items not moved from the root node, and to provide the outgoing data stream to a targeted recipient.

As a general proposition, for any given incoming data stream or corresponding stored data stream, the processing circuit 32 is configured to identify a targeted data item by accessing stored workflow information for a defined processing workflow, wherein the defined processing workflow indicates the targeted data item. The defined processing workflow may identify any number of data items as "targeted data items" and the processing circuit 32 is configured to extract each targeted data item and perform the previously-described operations of moving and populating for each targeted data item, in accordance with the traversal path to each targeted data item.

In at least some embodiments, the incoming data streams comprise byte streams encoded using Type-Length-Value, TLV, encoding. TLV encoding defines the hierarchical structure of the byte streams as a tree structure. Correspondingly, the traversal path to a given data item in an TLV-encoded byte stream extends through as many levels of the tree structure as are needed to reach the targeted data item.

More generally, in cases where the defined hierarchical structure of an incoming data stream comprises a tree structure, the processing circuit 32 in one or more embodiments is configured to traverse the defined hierarchical tree structure beginning at a base level of the tree structure and progressing via a breadth-first traversal to as many next levels of the tree structure as are needed to reach a targeted data item. Consequently, the breadth-first traversal at each level of the tree structure begins with a first data item at that level and advances through each next data item at that level until encountering the targeted data item, in which case the traversal ends, or until encountering a container data item that is on the traversal path, in which case the traversal advances to the first contained data item at the next level of the tree structure and the breadth-first traversal restarts at that next level. Here, it will be appreciated that a "container data item" contains one or more distinct data items, e.g., "child" data objects, and in fact may contain other container data items.

The contemplated traversal technique can be understood as drilling down along the most direct or shortest traversal path permitted by the encoding hierarchy of the incoming data stream. As noted, the incoming data stream may be a CDR comprising a plurality of data items associated with a chargeable event in the network 8. In a particular example, the first encoding applied to the incoming CDR comprises Abstract Syntax Notation One, ASN.1, encoding using, e.g., Basic Encoding Rules or BER.

Figure 2:
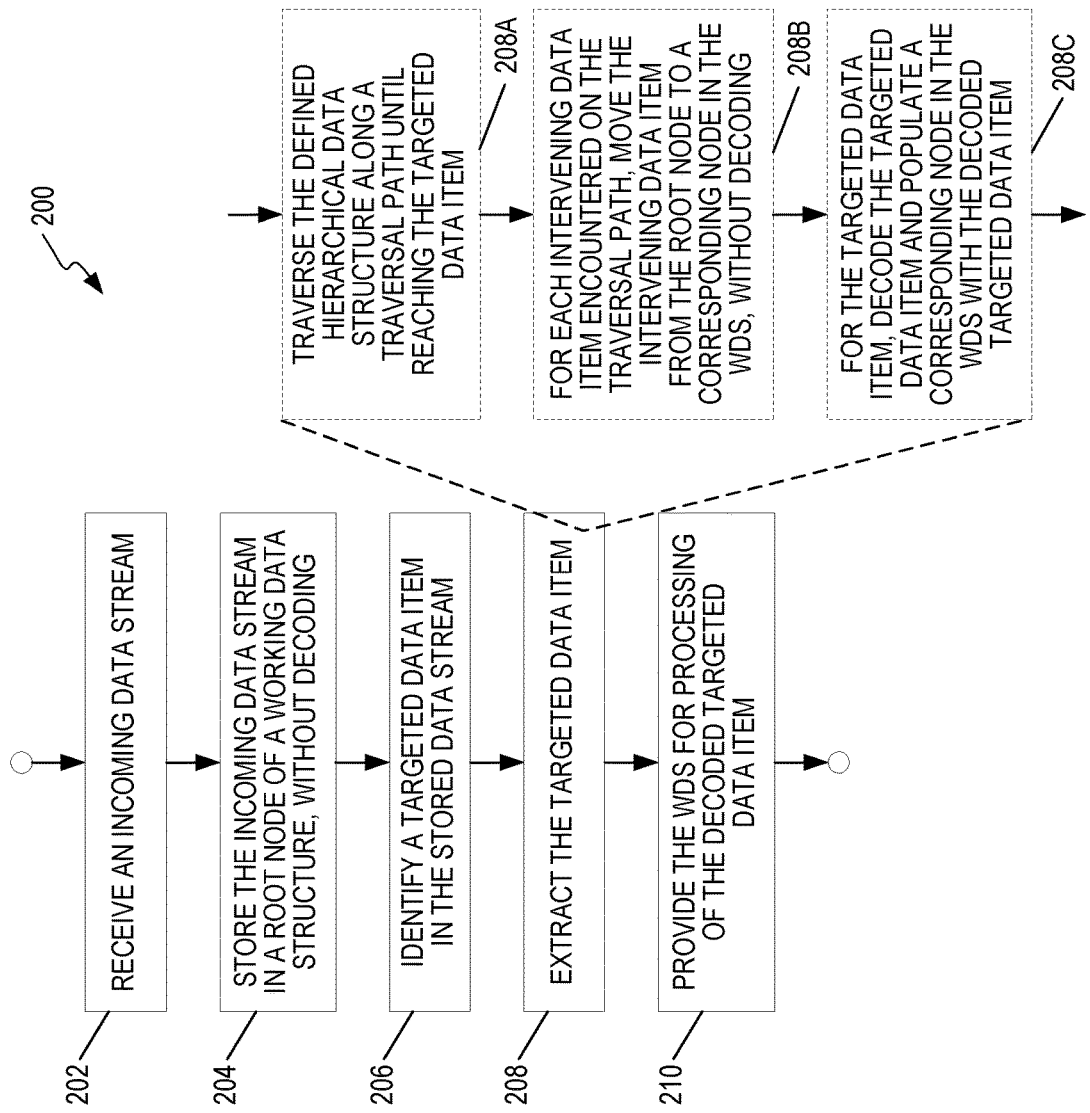
FIG. 2 is logic flow diagram of one embodiment of a method of data mediation.

FIG. 2 illustrates an example method 200 of processing at a mediation node 10 configured for data mediation operations in a telecommunication network 8. One or more of the method steps may be performed in an order other than that suggested by the example logic flow diagram. Further, all or part of the method 200 may be repeated for processing a given incoming data stream according to multiple desired processing operations, and the method 200 may be repeated for each in a number of incoming data streams and/or carried out in parallel with respect to different incoming data streams. Moreover, it will be understood that the method 200 may be performed in concert with or as part of other ongoing processing operations.

The method 200 comprises receiving (Block 202) an incoming data stream comprising encoded data items encoded according to a first encoding and arranged according to a defined hierarchical structure. The method 200 further includes storing (Block 204) the incoming data stream as a stored data stream, the stored data stream being stored without decoding at a root node of a working data structure 40 that defines further nodes corresponding to a plurality of data items encoded in the stored data stream.

The method 200 further includes identifying (Block 206) a targeted data item in the stored data stream, targeted for data mediation processing. Still further, the method 200 includes extracting (Block 208) the targeted data item.

This extraction includes traversing (Block 208A) the defined hierarchical structure of the stored data stream along a traversal path until reaching the targeted data item. For each intervening data item encountered along the traversal path before reaching the targeted data item, the method 200 includes moving (Block 208B), without decoding, the intervening data item from the root node to a corresponding further node in the working data structure 40. For the targeted data item, the method 200 includes decoding (Block 208C) the targeted data item and populating a corresponding further node in the working data structure 40 with the decoded targeted data item. Still further, the method 200 includes providing (Block 210) the working data structure 40 for processing of the decoded targeted data item.

Figure 3:
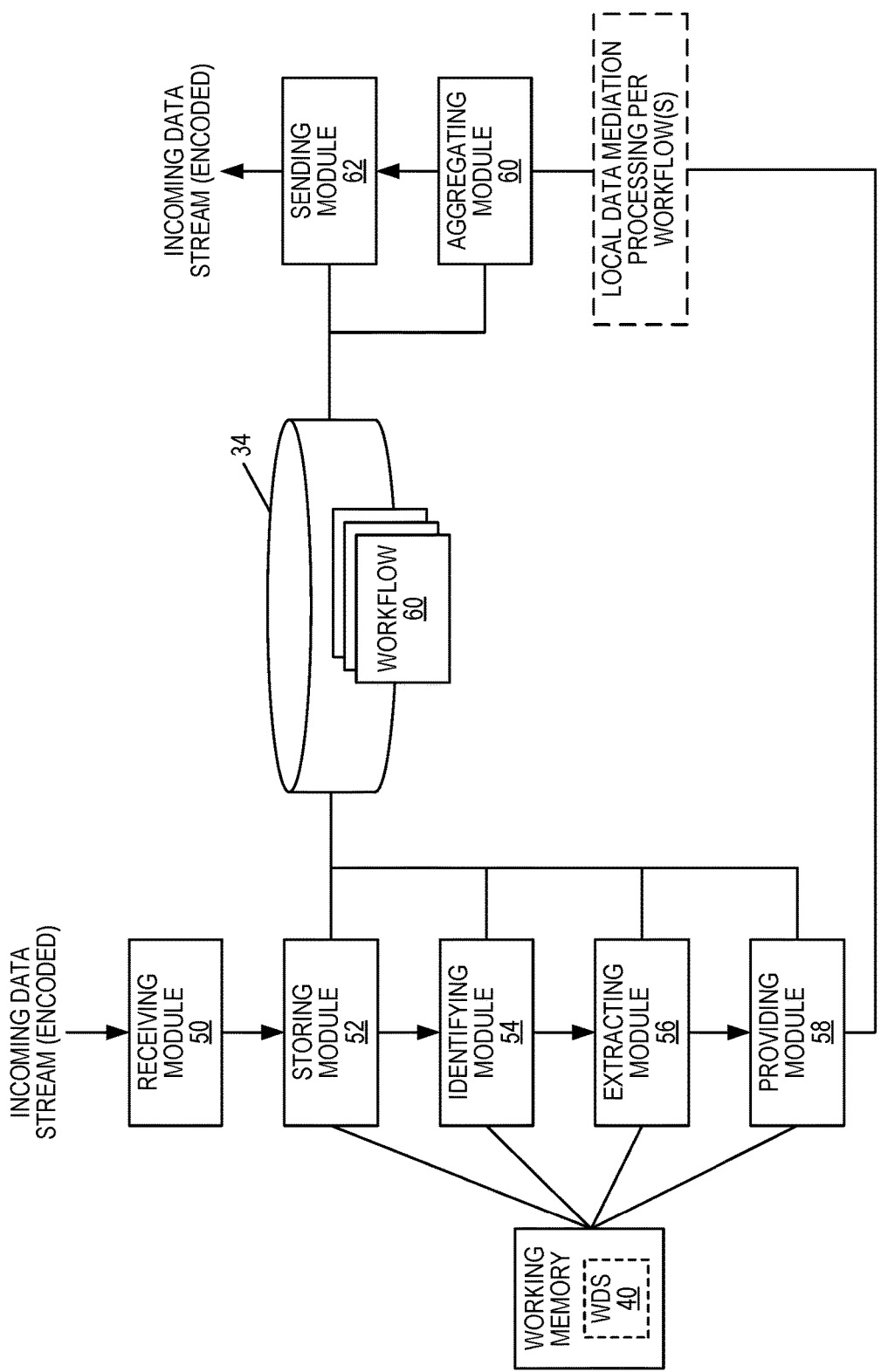
FIG. 3 is a block diagram of one embodiment of processing circuits or modules implemented in a mediation node.

FIG. 3 depicts a functional processing module arrangement, where the mediation node 10 comprises a first or receiving module 50 configured to receive an incoming data stream. The incoming data stream comprises encoded data items encoded according to a first encoding and arranged according to a defined hierarchical structure. The mediation node 10 further comprises a second or storing module 52 configured to store the incoming data stream as a stored data stream. The stored data stream is stored without decoding at a root node of a working data structure 40 that defines further nodes corresponding to a plurality of data items encoded in the stored data stream.

According to the illustrated embodiment, the mediation node 10 includes a third or identifying module 54 configured to identify a targeted data item in the stored data stream, targeted for data mediation processing. Additionally, the mediation node 10 includes a fourth or extracting module 56 configured to extract the targeted data item. The extraction is based on traversing the defined hierarchical structure of the stored data stream along a traversal path until reaching the targeted data item. For each intervening data item encountered along the traversal path before reaching the targeted data item, the extracting module 56 moves, without decoding, the intervening data item from the root node to a corresponding further node in the working data structure 40. For the targeted data item, the extracting module 56 decodes the targeted data item and populates a corresponding further node in the working data structure 40 with the decoded targeted data item. Complementing this arrangement, the mediation node 10 further comprises a fifth or providing module 58 configured to provide the working data structure 40 for processing of the decoded targeted data item.

As seen in the diagram, such processing may be performed in accordance with one or more workflows—shown in FIG. 3 as one or more workflows 60 stored in the storage 34. Note that the working data structure 40 may be held, at least temporarily, in working memory, such as may be done for run-time instantiation and use of the working data structure 40.

Further, although not specifically depicted in the diagram, the stored data stream as held in the root node of the working data structure 40 can be processed multiple times, as needed, to extract more than one data item for one workflow or for two or more workflows. Multiple workflows or multiple processing operations can thus involved the same working data structure 40 and the path-traversal operations described herein can be performed as many times as needed, for extraction of all targeted data items, with each traversal benefitting from any path overlaps with prior traversals.

After completing the workflow processing, the processing results may be needed by another process or node and the mediation node 10 includes a sixth or aggregating module 60. The aggregating module 60 aggregates the decoded targeted data items, or data items obtained therefrom, together with the intervening data items that were populated into their respective nodes in the working data structure 40 without decoding, and together with the remaining data items left in encoded form in the root node. This aggregation will be understood as including a re-encoding of decoded targeted data items or the new data items obtained therefrom. The re-encoding generally will follow or otherwise preserve the data hierarchy of the incoming data stream. In that way, a given type of incoming data stream, e.g., a given incoming byte stream, can be processed to form a new or modified data stream having the same structure and format, and the new or modified data stream can then be re-encoded in form compatible with the incoming byte stream, for passing along to a further process or node.

The targeted recipient for the processed data may be within the mediation node 10, such as where one data mediation process provides results to another data mediation process, or the targeted recipient may be external to the mediation node 10. In either case, the processing circuit 32 in one or more embodiments is configured to pass processed data streams across process boundaries in a manner that is compatible with the encoding and exchange protocols generally applicable to those boundaries and to the involved data types. For example, each "user process" implemented by the processing circuit 32 within the mediation node 10 may perform incoming data stream processing and provide a corresponding outgoing data stream having the same encoding and/or structure as the incoming data stream. Here, a "user process" may be defined as that function or collection of functions defined by a given workflow 60.

Figure 4:
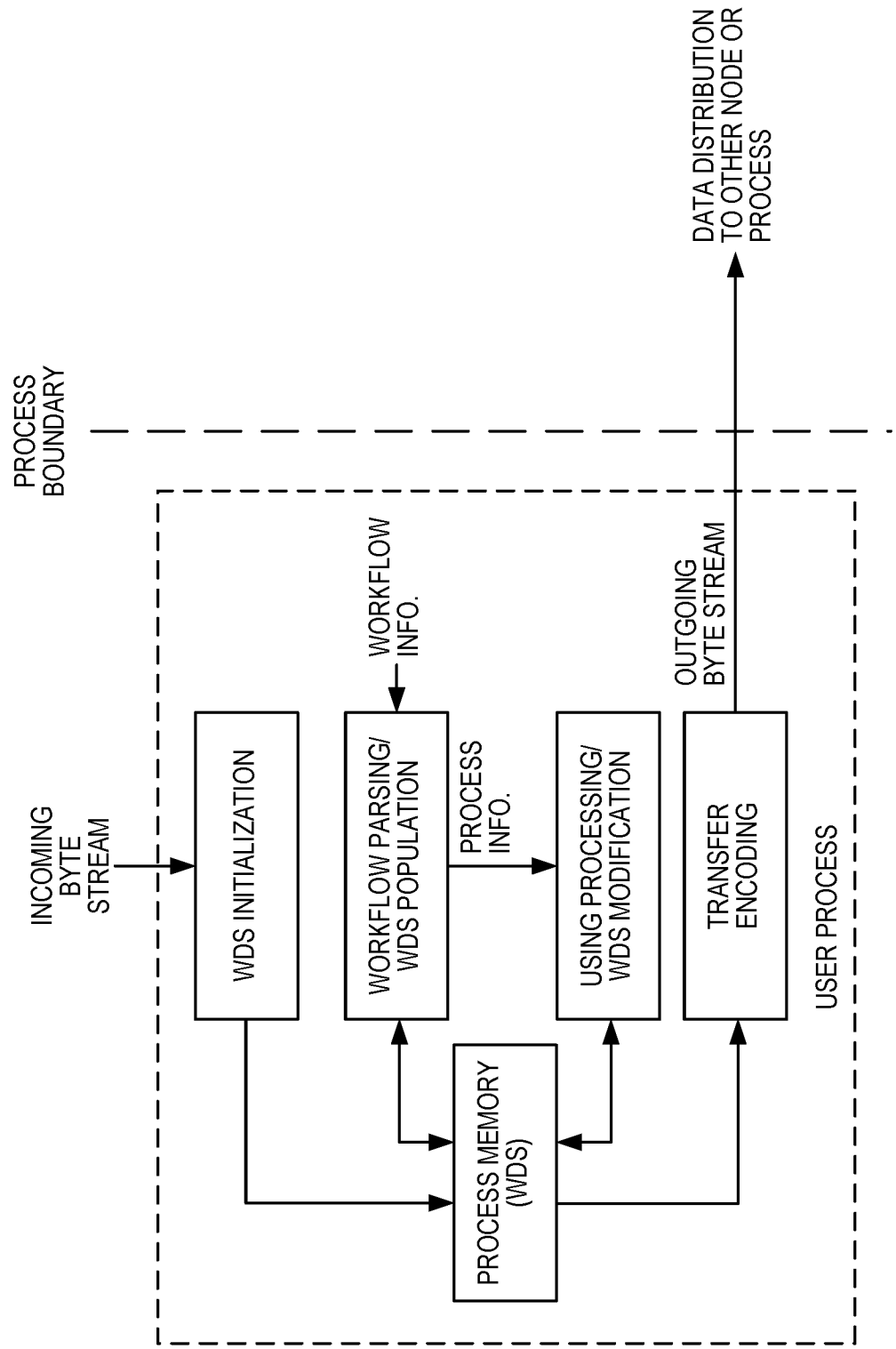
FIG. 4 is a data flow diagram of one embodiment of a processing flow implemented in a mediation node with respect to incoming data stream processing.

FIG. 4 is a data flow diagram according to one or more embodiments taught herein, and provides a helpful illustration in the context of different user processes. One sees that an incoming byte stream is subjected to a number of processing steps or operations, as explained in the above examples. Such processing involves an advantageous extraction of the targeted data items—the ones needed for whatever particular processing has been specified for a given workflow or job—and does so without unnecessary decoding and while maintaining a compact memory footprint for the stored data.

More particularly, one sees that workflow information is parsed to identify the particular data item or items of the incoming byte stream that are targeted—needed—for the processing operations stipulated by the workflow information. A working data structure 40—simply "WDS" in the diagram—is instantiated in process memory, e.g., in a working memory. The WDS structure reflects the data items and the corresponding data hierarchy represented by the incoming byte stream, which is stored without decoding in a root node of the WDS.

The path-traversal processing is carried out, as described above. In short, the workflow information identifies, directly or indirectly, the particular data items of the incoming byte stream that are needed in decoded form to carry out the processing defined by the workflow 60. The mediation node 10 extracts these targeted data items and moves them from the root node to their corresponding nodes in the WDS, where they are held in decoded form for processing. The intervening data items, i.e., those data items that are encountered on the traversal path to the targeted data items but not needed for the workflow processing, are also moved from the root node to their corresponding nodes in the WDS, but they are moved without decoding.

The "user processing" as defined by the applicable workflow 60 defining the illustrated "User Process" is carried out. As such, the WDS may and generally will hold derived or modified data, as compared to the original incoming data stream. To the extent that the modified version of the data stream needs to be provided for recordkeeping or further processing, one sees that "transfer encoding" may be applied to the WDS, to form an outgoing data stream that is encoded and structured according to whichever protocols or standards are applicable to the contemplated transfer. In at least one embodiment, the WDS with its modified or processed data is re-encoded in a manner like that used for the original incoming data stream, which means that the outgoing data stream is compatible with any recipient processes or nodes that were compatible with the original incoming data stream.

Several of the foregoing examples assumed that the incoming data stream was a CDR, but those examples are non-limiting. The mediation node 10 may receive and process another type or other types of incoming data streams, in addition to, or as an alternative to, the CDR type mentioned above. In one example, the mediation node 10 receives incoming data streams that are CDRs, and also receives incoming data streams that contain various performance data for the telecommunication network 8. Broadly, the mediation node in one or more embodiments collects both charging and performance data from different network domains, and it distributes the data and/or derived data to multiple BSS Applications and Service Assurance Applications. For example, after its collection of such data in its various incoming forms, the mediation node 10 performs aggregation, enrichment, and/or correlation processing of such data, before distributing the data and any processing results to downstream applications.

Figure 5:
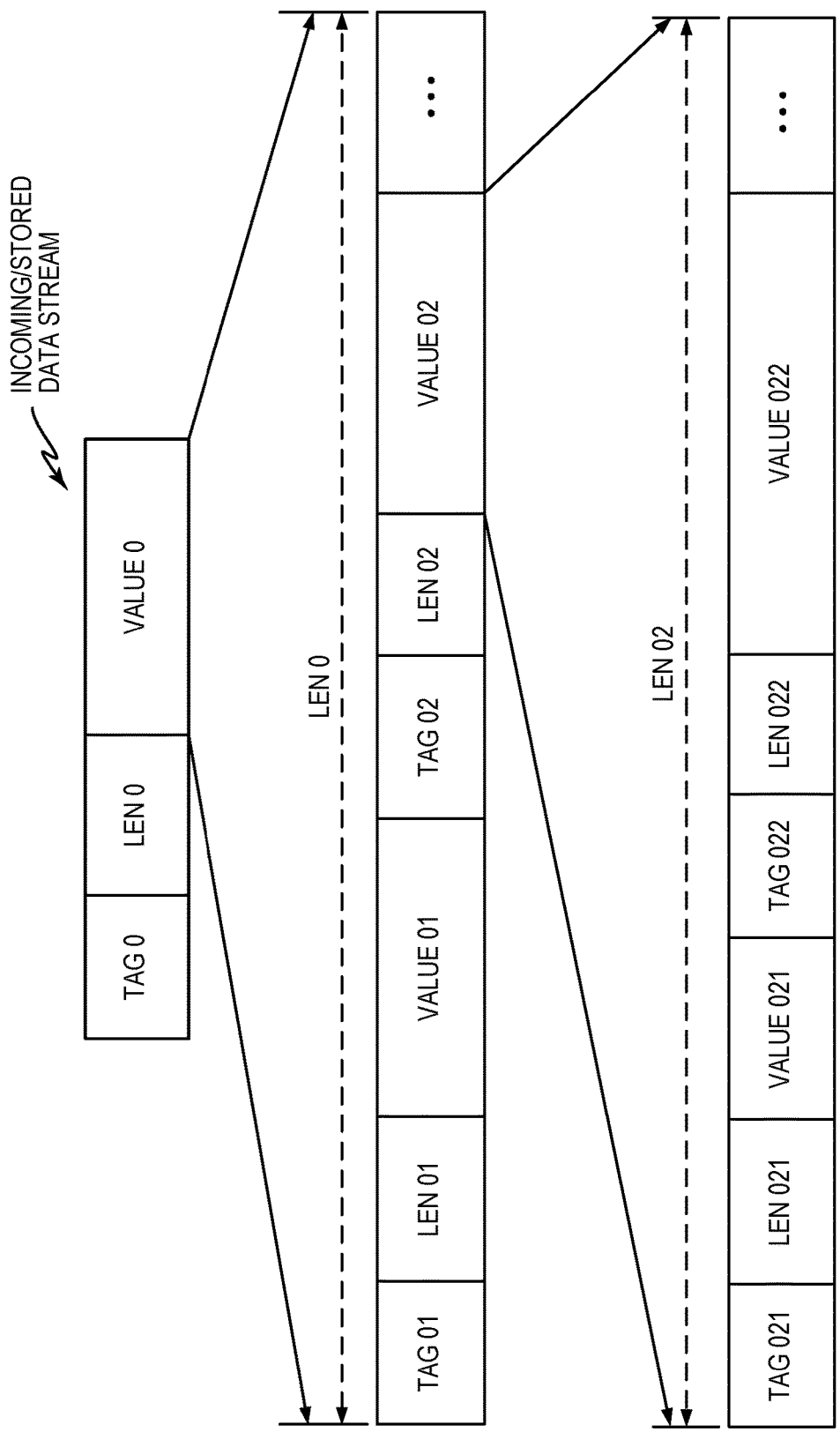
FIG. 5 is a diagram of a data structure associated with Type-Length-Value, TLV, encoding, which is known for certain data encoding operations in telecommunication networks.

To get a better sense of how the mediation node method and apparatus at issue in the above examples perform such processing operations, consider FIG. 5, which diagrams the hierarchical data structure of example TLV-encoded data. The illustrated structure is typical for ASN.1 BER encoding.

Assuming, then, that the mediation node receives an incoming data stream comprising the example TLV-encoded data shown in FIG. 5, one sees that various data elements—also referred to as data items or fields—are mapped onto data objects. Again, these data objects are BER-TLV encoded. The encoding at issue in this working example is defined in the ISO/IEC 8825 standard. Here, "ISO" denotes the International Standards Organization and "IEC" denotes the International Electrotechnical Commission.

Each data item is represented in TLV-encoding by three fields: a tag, a length, and a value. The "tag" defines the type of data, the "length" defines the total data length for the object, and the "value" represents the encoded data. When the value field of a data object consists of one single data element, it is called a primitive data object. When the value field of a data object recursively encapsulates one or more other data objects, it is called a constructed data object. For purposes of this discussion, a constructed data object may also be referred to as a "container data item", to indicate that it contains one or more other data objects. The data objects within one of these constructed data objects may also be referred to as "contained data items".

With these rules in mind, assume that the incoming data stream represented by the TLV-encoded data of FIG. 5 is received at the mediation node 10 and that a given workflow targets the data item 022 for processing. Thus, according to the teachings herein, the mediation node 10 will traverse the hierarchical structure of the incoming data stream, to reach the data item 022, which will be extracted and populated in decoded form in a corresponding node of a working data structure 40 that embodies the hierarchical structure of the encoded incoming data stream.

Figure 6:
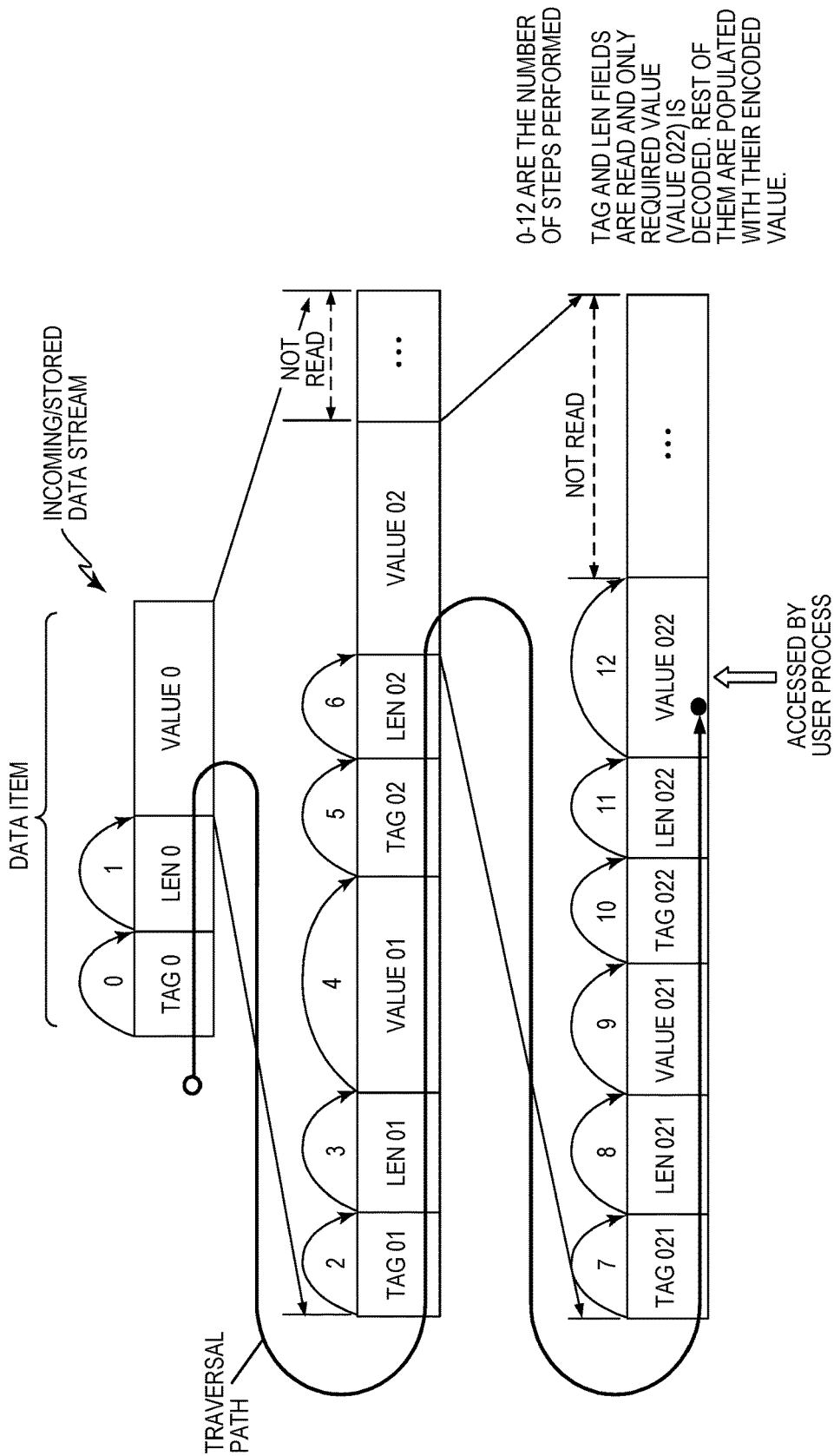
FIG. 6 is a diagram of an example traversal path, such as would be used in one or more embodiments taught herein, for processing an example incoming data stream that is TLV-encoded.

FIG. 6 illustrates the traversal path at issue in this example, where the first hierarchical level of the structure defined by the incoming data stream includes the data item 0, as represented by "TAG 0", "LEN 0" and "VALUE 0". Here, VALUE 0 is the data payload of data item 0. The data item 0 is a container data item, as it contains data items 01 and 02, and possibly many more data items at the same hierarchical level, as suggested by the ellipses in the "NOT READ" portion of the data structure following the data item 02. In turn, the data item 02 itself is a container data item, as it contains data items 021 and 022, and possibly many more data items at the same hierarchical level, as suggested by the ellipses in the "NOT READ" portion of the data structure following the data item 022.

The working data structure 40 includes a root node that is initially populated with the incoming data stream, without any "unpacking" or decoding, and the hierarchical structure of the stored data stream is traversed using a breadth-first algorithm. Thus, the mediation node 10 traverses the first hierarchical level until it finds the data item 01, which it recognizes as containing the data item 022. From the data item 01, it descends down one level of the hierarchy and begins looking for the data item 022, or for the data item containing data item 022. Thus, it traverses through the data item 01 to reach the data item 02, at which point it descends down one more level of the hierarchy, where it traverses through the data item 021, to reach the targeted data item 022.

It will be appreciated that the working data structure 40 has a root node for the overall incoming data stream, and then respective branch nodes containing the data items 01 and 02, which were encountered as intervening data items along the traversal path. The data item 01 is moved from the root node storage and into a corresponding node in the hierarchy of the working data structure 40, but it is not decoded. The same thing is done for the data item 02.

Further hierarchical branch nodes are populated for the data items 021 and 022, with the 021 node including the data item 021 in encoded form as another intervening data item and the 022 node including the data item 022 in decoded form as a targeted data item. Note that the data items in the "NOT READ" portions of the incoming data stream are not moved from the root node—i.e., these remaining data items were not moved from the root node because they were not encountered on the traversal path and they were not targeted for processing. Of course, the same data stream can be processed again, or processed iteratively, with respect to one or more other data items targeted for processing, and any further populations of the working data structure 40 can be performed incrementally, by adding populated nodes in the working data structure 40 with any new intervening and/or targeted data items.

The above processing can be understood as a form of "just in time" decoding, where the mediation node 10 determines the path to a targeted data item included in an incoming data stream, e.g., an incoming byte stream in TLV-encoded format. In the above example, the mediation node 10 determines the traversal path to the data item 022 as "data item 0→data item 01→data item 02→data item 021→data item 022". Once the traversal path is known, path iteration starts and includes three actions in an example implementation.

As a first action, the mediation node 10 performs an interruptible breadth-first search that parses the tree structure using a breadth-first search, BFS, algorithm. The BFS algorithm is interrupted at the point where the targeted data item is encountered or where a container data item is encountered. Assuming that a container data item is encountered, the BFS is continued at the next hierarchical level inspecting the encountered data item. As a second action or operation, the mediation node 10 performs value population, where it assigns intervening data items to their corresponding nodes in the working data structure 40, without decoding them. It populates the working data structure 40 with the encoded data items it encounters as intervening data items on the traversal path. As a third action, the mediation node 10 performs actual decoding of the targeted data item or items, and populates the corresponding node or nodes in the working data structure 40.

In many cases, such as where a given incoming data stream includes a large plurality of data items, but has a relatively short traversal path or paths to the targeted data item or items, most of the data items in the incoming data stream are left in encoded form in the root node of the working data structure 40. No processing is "wasted" on these remaining data items, and very little processing is expended on the intervening data items, which are simply moved from the root node to their corresponding nodes in the working data structure 40. Still further, the processing expended on actual decoding is reserved just for those data items that are targeted for processing by the workflow or workflows being handled.

FIG. 7 illustrates a sample ASN.1 template, with sample data that could be assigned to a working data structure 40 according to the teachings herein. In particular, the diagram illustrates a hexadecimal byte stream representation of the sample data, such as could be received as an incoming data stream and stored in a root node of a working data structure 40. For example, the hexadecimal byte stream is received by the mediation node 10, and it is known by the mediation node 10 that the sample ASN.1 template applies to the received byte stream.

Figure 8:
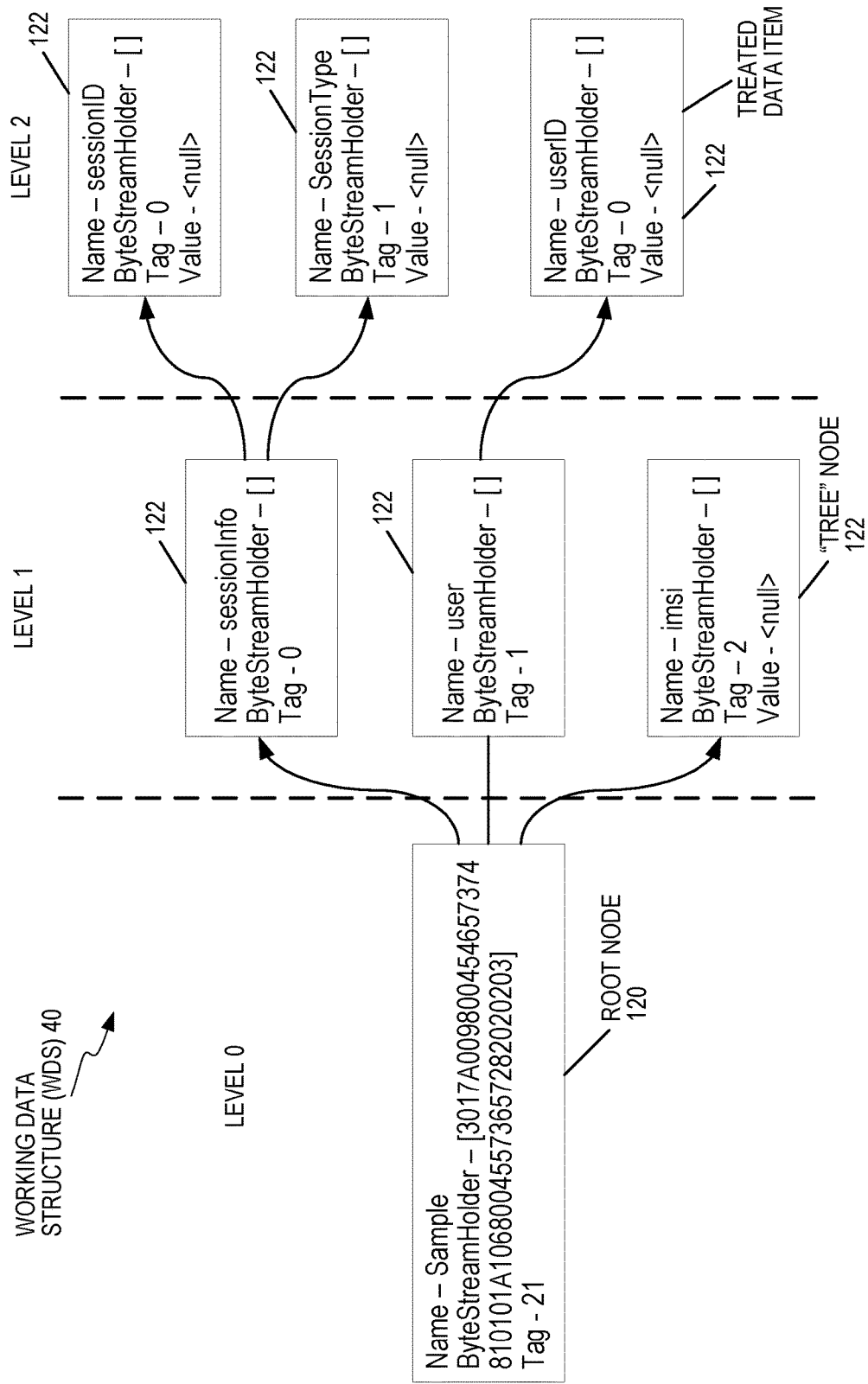
FIG. 8 is a diagram of one embodiment of a working data structure, which contains nodes and corresponding node data according to the incoming data stream of FIG. 7.

FIG. 8 illustrates the correspondingly instantiated working data structure 40, which includes Level 0, Level 1 and Level 2 nodes, corresponding to the hierarchy of the encoded data in the received byte stream. Level 0 of the working data structure 40 includes a root node 120, which initially holds the byte stream in encoded form. Level 1 includes three nodes 122 that are populated as part of path traversal. One sees that each of these three Level-1 nodes 122 corresponds to a different data item in the byte stream, at that hierarchical level. Level 2 includes a further three nodes 122 and, again, these further nodes 122 each correspond to a given data item in the byte stream that exists at that level of the data hierarchy.

All nodes needed to represent the hierarchical data items of the incoming byte stream may logically exist in terms of the data structure definition used to instantiate the working data structure 40. Such an arrangement completely accounts for the hierarchical structure of the received byte stream. However, only the nodes 122 corresponding to intervening data items and targeted data items are populated. Moreover, the nodes 122 for intervening data items are populated with encoded data, and only the nodes 122 for targeted data items are populated with decoded data.

In the example of FIG. 8, the bottom-right node 122, the one holding the "userID" data item is a "treated data item"—i.e., it is targeted for data processing. Thus, assuming that userID is the only targeted data item, only its corresponding node 122 would hold decoded data.

Assuming that the other illustrated Level 1 and Level 2 nodes were encountered as intervening nodes in the traversal to the userID data item, those nodes would be populated with their respective data items still in encoded form. The intervening and targeted data items will have been moved from the root node 120, which saves memory in comparison to leaving them in the root node 120, as well as populating them into the further node 122.

The teachings herein are not limited to the ASN.1/BER specification, or to Charging Data Record data types, and instead are applicable to essentially any type of TLV structured data. As compared to convention encoding and decoding of entire data structures and all included data items, the adoption of these teachings for processing such data yields end-to-ends performance improvements, significant reductions in memory utilization, significant reductions in CPU utilization, significant reductions in encoding/decoding "overhead" in distributed processing systems, and corresponding reductions in the overall hardware requirements of data mediation nodes.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of processing at a mediation node configured for data mediation operations in a telecommunication network, the method comprising:
    receiving an incoming data stream comprising encoded data items encoded according to a first encoding and arranged according to a defined hierarchical structure;
    storing the incoming data stream as a stored data stream, said stored data stream stored without decoding at a root node of a working data structure that defines further nodes corresponding to a plurality of data items encoded in the stored data stream;
    identifying a targeted data item in the stored data stream, targeted for data mediation processing;
    extracting the targeted data item based on:
        traversing the defined hierarchical structure of the stored data stream along a traversal path until reaching the targeted data item; and
        for each intervening data item encountered along the traversal path before reaching the targeted data item, moving, without decoding, the intervening data item from the root node to a corresponding further node in the working data structure;
        for the targeted data item, decoding the targeted data item and populating a corresponding further node in the working data structure with the decoded targeted data item; and
    providing the working data structure for processing of the decoded targeted data item.

2. The method of claim 1, further comprising forming an outgoing data stream by re-encoding the decoded targeted data item or a corresponding derived data item, after said processing, as a newly-encoded data item, and aggregating the newly-encoded data item with each intervening data item previously moved to a corresponding further node in the working data structure, and further with any remaining data items not moved from the root node, and providing the outgoing data stream to a targeted recipient.

3. The method of claim 1, wherein identifying the targeted data item comprises accessing stored workflow information for a defined processing workflow, wherein the defined processing workflow indicates the targeted data item.

4. The method of claim 3, wherein the defined processing workflow indicates the targeted data item as one of two or more targeted data items and wherein the method includes extracting each targeted data item and performing said steps of moving and populating for each targeted data item, in accordance with the traversal path to each targeted data item.

5. The method of claim 1, wherein the incoming data stream comprises a byte stream encoded using Type Length Value (TLV) encoding that defines the defined hierarchical structure as a tree structure, and wherein the traversal path extends through as many levels of the tree structure as are needed to reach the targeted data item.

6. The method of claim 1, wherein the defined hierarchical structure comprises a tree structure and wherein traversing the defined hierarchical structure comprises beginning at a base level of the tree structure and progressing via a breadth-first traversal to as many next levels of the tree structure as needed to reach the targeted data item, such that the breadth-first traversal at each level of the tree structure begins with a first data item and advances through each next data item at that level until encountering the targeted data item, in which case the traversal ends, or until encountering a container data item that is on the traversal path, in which case the traversal advances to a first contained data item at the next level of the tree structure and restarts the breadth-first traversal at that next level.

7. The method of claim 1, wherein the incoming data stream is an encoded Charging Data Record comprising a plurality of data items associated with a chargeable event in the telecommunication network.

8. The method of claim 1, wherein the first encoding comprises Abstract Syntax Notation One (ASN.1) encoding.

9. A mediation node configured for data mediation operations in a telecommunication network, the mediation node comprising:
    a communication interface configured to receive an incoming data stream comprising encoded data items encoded according to a first encoding and arranged according to a defined hierarchical structure;
    a processing circuit operatively associated with the communication interface and configured to:
        store the incoming data stream as a stored data stream, said stored data stream stored without decoding at a root node of a working data structure that defines further nodes corresponding to a plurality of data items encoded in the stored data stream;
        identify a targeted data item in the stored data stream, targeted for data mediation processing;
        extract the targeted data item based on being configured to:
            traverse the defined hierarchical structure of the stored data stream along a traversal path until reaching the targeted data item; and
            for each intervening data item encountered along the traversal path before reaching the targeted data item, move, without decoding, the intervening data item from the root node to a corresponding further node in the working data structure;
            for the targeted data item, decode the targeted data item and populate a corresponding further node in the working data structure with the decoded targeted data item; and
        provide the working data structure for processing of the decoded targeted data item.

10. The mediation node of claim 9, wherein the processing circuit is further configured to form an outgoing data stream, based on being configured to:

re-encode the decoded targeted data item after said processing, or a corresponding derived data item generated by said processing, as a newly-encoded data item; and aggregate the newly-encoded data item with each intervening data item previously moved to a corresponding further node in the working data structure, and further with any remaining data items not moved from the root node, and provide the outgoing data stream to a targeted recipient.

11. The mediation node of claim 9, wherein the processing circuit is configured to identify the targeted data item by accessing stored workflow information for a defined processing workflow, wherein the defined processing workflow indicates the targeted data item.

12. The mediation node of claim 11, wherein the defined processing workflow indicates the targeted data item as one of two or more targeted data items and wherein the processing circuit is configured to extract each targeted data item and perform said operations of moving and populating for each targeted data item, in accordance with the traversal path to each targeted data item.

13. The mediation node of claim 9, wherein the incoming data stream comprises a byte stream encoded using Type Length Value (TLV) encoding that defines the defined hierarchical structure as a tree structure, and wherein the traversal path extends through as many levels of the tree structure as are needed to reach the targeted data item.

14. The mediation node of claim 9, wherein the defined hierarchical structure comprises a tree structure and wherein the processing circuit is configured to traverse the defined hierarchical tree structure beginning at a base level of the tree structure and progressing via a breadth-first traversal to as many next levels of the tree structure as is needed to reach the targeted data item, such that the breadth-first traversal at each level of the tree structure begins with a first data item and advances through each next data item at that level until encountering the targeted data item, in which case the traversal ends, or until encountering a container data item that is on the traversal path, in which case the traversal advances to a first contained data item at the next level of the tree structure and restarts the breadth-first traversal at that next level.

15. The mediation node of claim 9, wherein the incoming data stream is an encoded Charging Data Record comprising a plurality of data items associated with a chargeable event in the telecommunication network.

16. The mediation node of claim 9, wherein the first encoding comprises Abstract Syntax Notation One (ASN.1) encoding.

17. A mediation node configured for data mediation operations in a telecommunication network, the mediation node comprising:

a first module configured to receive an incoming data stream comprising encoded data items encoded according to a first encoding and arranged according to a defined hierarchical structure;

a second module configured to store the incoming data stream as a stored data stream, said stored data stream stored without decoding at a root node of a working data structure that defines further nodes corresponding to a plurality of data items encoded in the stored data stream;

a third module configured to identify a targeted data item in the stored data stream, targeted for data mediation processing;

a fourth module configured to extract the targeted data item based on:

traversing the defined hierarchical structure of the stored data stream along a traversal path until reaching the targeted data item; and for each intervening data item encountered along the traversal path before reaching the targeted data item, moving, without decoding, the intervening data item from the root node to a corresponding further node in the working data structure;

for the targeted data item, decoding the targeted data item and populating a corresponding further node in the working data structure with the decoded targeted data item; and a fifth module configured to provide the working data structure for processing of the decoded targeted data item.

* * * * *